Feb. 17, 1942.   E. J. DUNHAM ET AL   2,273,630
INDUSTRIAL TRACTOR
Filed Aug. 23, 1939   5 Sheets-Sheet 1
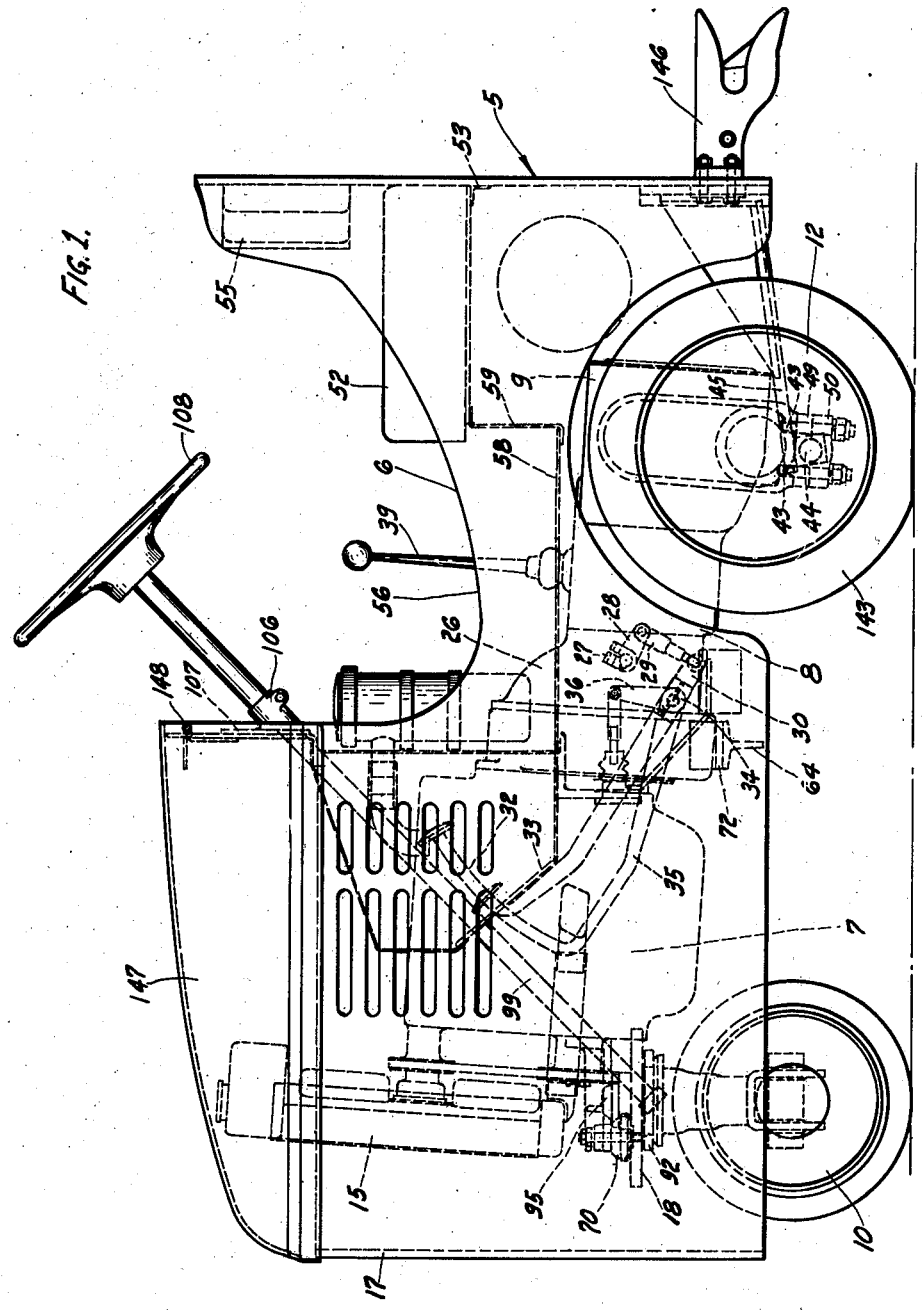
INVENTOR
ELMER J. DUNHAM, WAYNE GUNNING.
BY
ATTORNEY

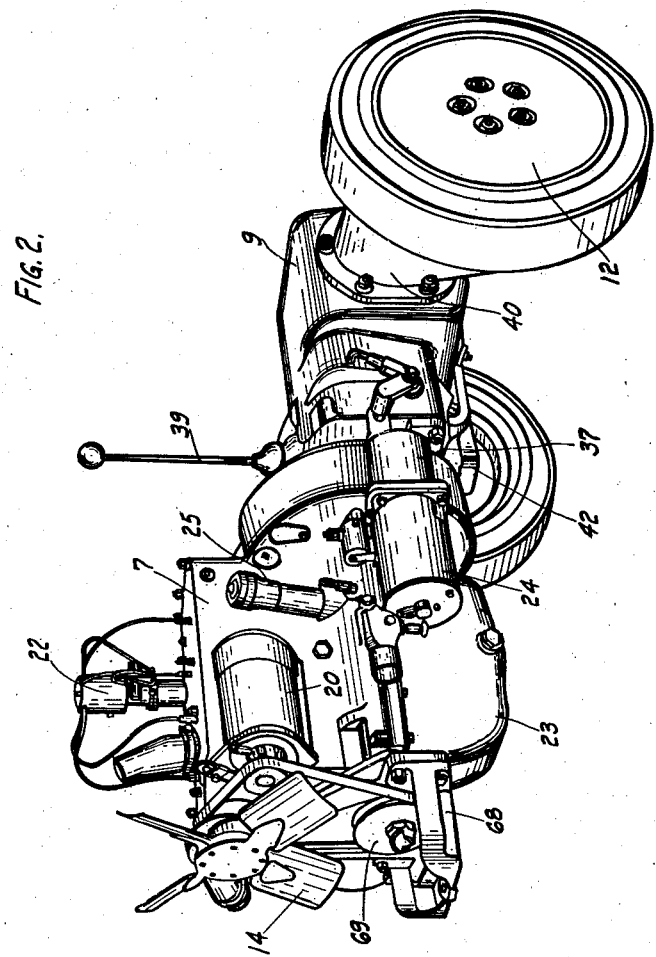

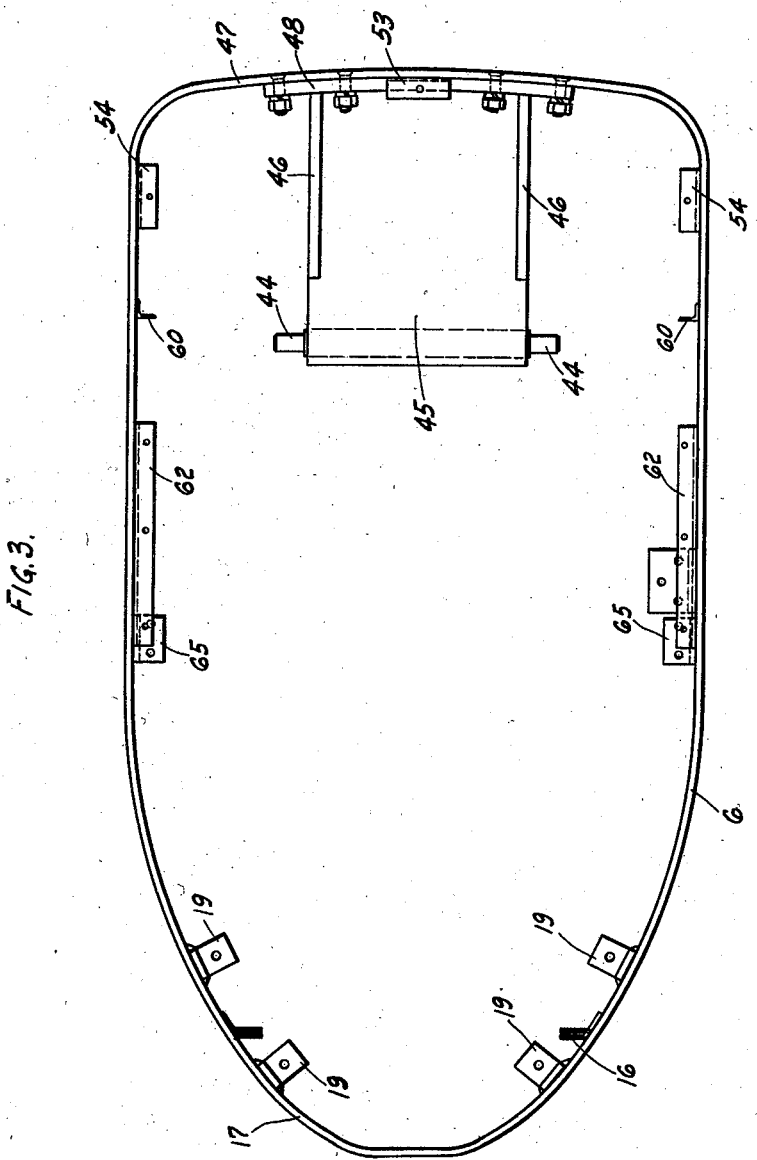

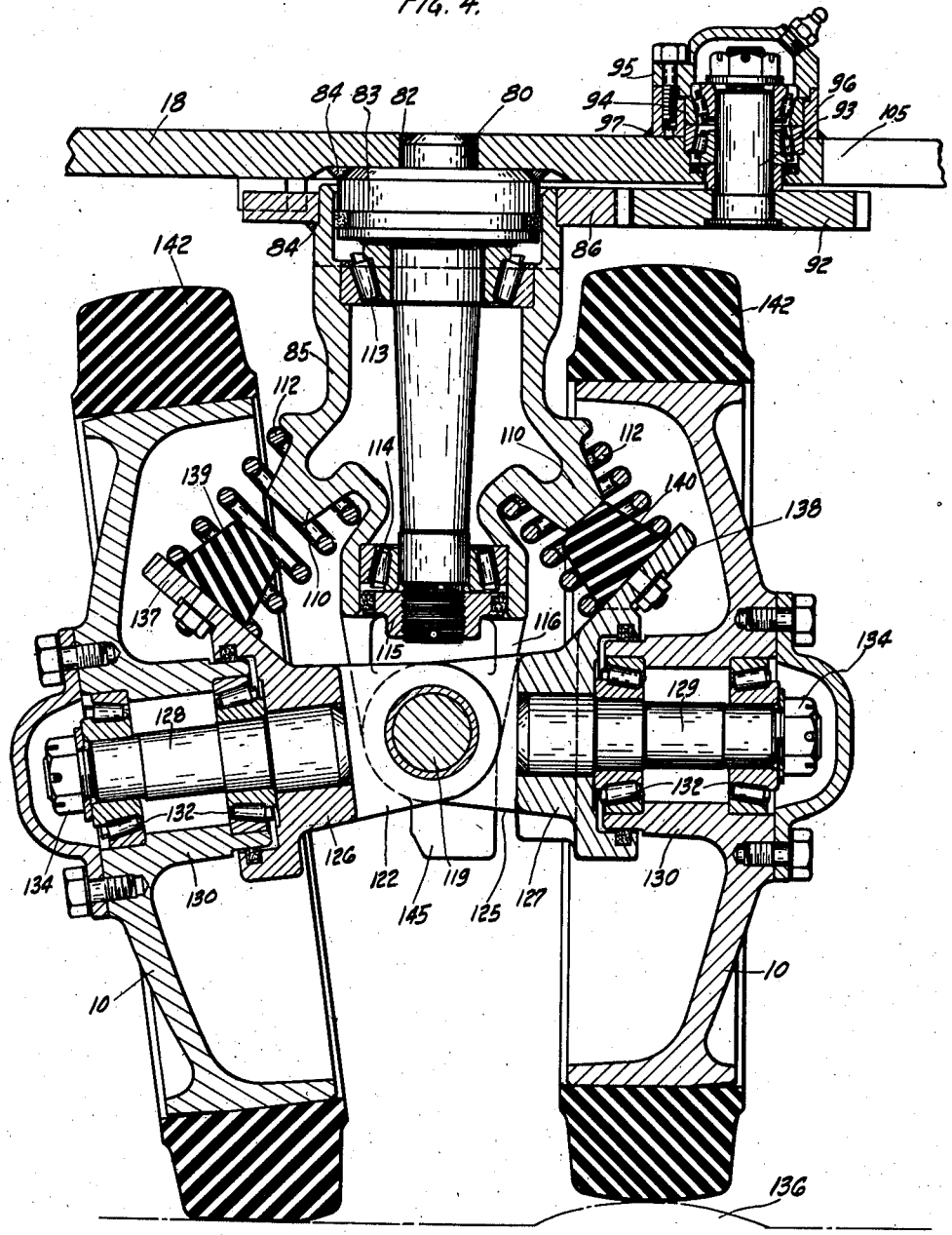

Feb. 17, 1942.　　E. J. DUNHAM ET AL　　2,273,630
INDUSTRIAL TRACTOR
Filed Aug. 23, 1939　　5 Sheets-Sheet 5
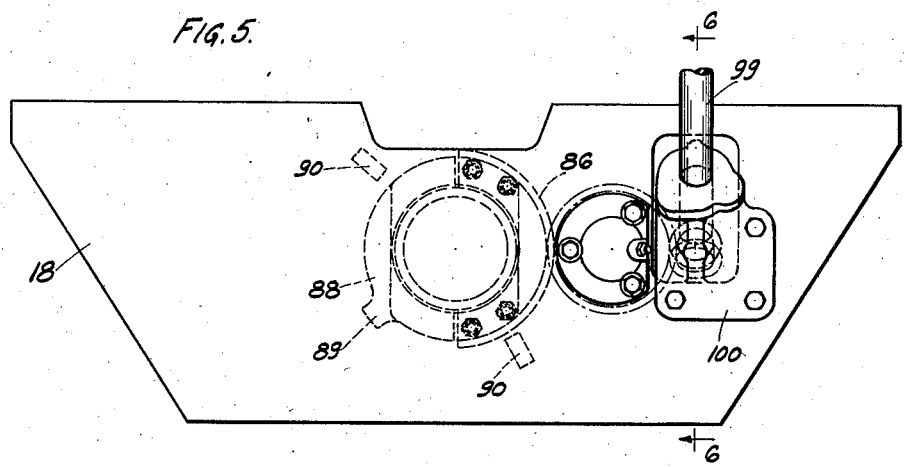
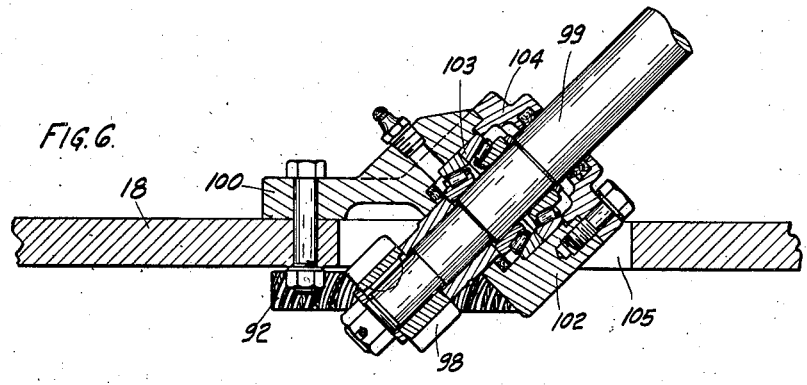
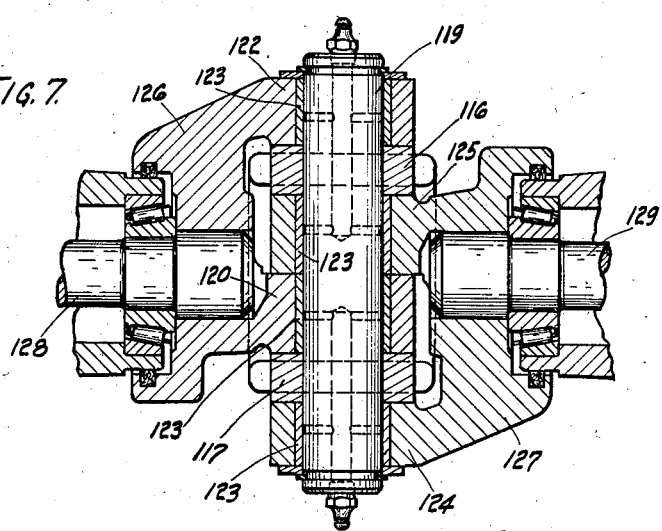
INVENTOR
ELMER J. DUNHAM, WAYNE GUNNING.
BY
ATTORNEY Patented Feb. 17, 1942

2,273,630

UNITED STATES PATENT OFFICE 2,273,630

INDUSTRIAL TRACTOR

Elmer J. Dunham and Wayne Gunning, Battle Creek, Mich., assignors to Clark Equipment Company, Buchanan, Mich., a corporation of Michigan Application August 23, 1939, Serial No. 291,526

11 Claims. (Cl. 280—87)

This invention relates to industrial tractors, and more particularly is concerned with industrial tractors for use around warehouses, manufacturing and mercantile plants, loading docks, shipyards, and the like where it is desired to transport one or more trailers by means of a power tractor that can draw the trailers from one point to the other, as conditions require.

The present construction contemplates an entire revision and redesign of industrial tractors of the type shown in the patent to Robert J. Burrows, No. 1,715,629 issued June 4, 1929.

One of the primary objects of the present invention is to design a shop tractor of this general character which has greatly increased maneuverability, is more streamlined in appearance, and comprises essentially a knee-action type of front wheel suspension facilitating its travel over uneven roadways in combination with a novel design of steering mechanism for facilitating its maneuvering in close quarters.

One of the advantages of the present invention is the provision of a dual wheel, front steering assembly in which the two wheels are mounted upon a common steering pintle with each of the wheels being relatively movable with respect to the opposite wheel in a vertical direction to accommodate uneven road surfaces.

Another feature of the present invention is the provision of an improved steering arrangement in which the steering shaft is geared to the pintle or caster shaft carrying the forward wheels by a direct gear arrangement so designed as to limit the steering movement within a relatively wide angle to allow the vehicle to turn in an extremely short radius.

Still another feature of the present invention is the provision of a body and frame construction which is designed for mass production, and which requires little or no skill in assembling so that the body, in effect, forms the chassis for the vehicle and the power plant and driving mechanisms are secured directly to the body assembly to form a unitary construction. This eliminates expensive assembly operations, and materially reduces the cost of such machines while at the same time retaining the advantages of simplicity and accessibility of maintenance and repair.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a side elevational view of an industrial tractor embodying the present invention;

Figure 2 is a perspective view of the power plant and drive axle assembly;

Figure 3 is a plan view of the body frame and mounting arrangement;

Figure 4 is a vertical sectional view through the steering mechanism and front wheel assembly;

Figure 5 is a plan view of the front wheel supporting plate;

Figure 6 is a sectional view taken substantially on line 6—6 of Figure 5; and

Figure 7 is a transverse sectional view through the pivotal mounting for the front wheels.

Referring now in detail to the drawings, the tractor is indicated generally at 5 and comprises a frame portion 6, a power plant 7, a transmission 8 and a differential drive axle assembly 9 disposed within the body portion 6.

The forward portion of the vehicle is carried upon the closely spaced front wheels 10, the mounting and control of which will be described in detail hereinafter. The rear portion of the vehicle is supported on the driving wheels 12 which are geared to the axle assembly 9 to be driven from the power plant 7.

Considering now the power plant and drive axle assembly in detail as shown in Figure 2, the engine 7 may be of any conventional internal combustion engine type, and has at the forward end thereof the conventional fan 14 which is disposed directly back of a radiator 15. The radiator 15 is adapted to be mounted within the frame 6 by means of the mounting brackets 16 shown clearly in Figure 3, these brackets being secured to the inner surfaces of the nose portion 17 of the truck above the motor supporting bracket plate 18, shown clearly in Figure 5. The plate 18 is secured to the frame 6 by means of the supporting brackets 19, shown in Figure 3, to which the plate 18 is secured.

The power plant is provided with the conventional auxiliary mechanisms, such as the generator 20, the distributor 22, the crankcase 23, the starter motor 24, and the oil fill tube 25. Bolted to the rear face of the flywheel housing of the engine is the clutch housing 26, shown in dotted lines in Figure 1, having carried thereon the clutch operating shaft 27 which, through the arm 28, link 29 and lever 30, is connected to the clutch pedal 32 disposed on the inclined toe board 33 within the frame of the vehicle. The clutch pedal 32 is mounted for pivotal movement about a stub shaft 34 on which is also mounted the brake pedal 35, which brake pedal through the arm 36 is adapted to actuate the master cylinder 37 of a hydraulic braking system employed on the driving wheels 12.

Bolted to the rear face of the clutch housing 26 is the transmission 8 having the upwardly extending gear shift lever 39 whereby the desired change speed ratios through the transmission can be selected. The driving axle assembly 9 includes a differential having jack shafts extending through the housing arms 40 bolted to the opposite sides of the housing 9 which, at their ends carry suitable pinions engaging internal ring gears in the wheels 12 for transmitting torque thereto in the conventional manner.

Formed on each of the housing arms 40 is a forwardly extending boss portion 42 which is suitably tapped to receive the threaded ends of the studs 43 shown in Figure 1 whereby these boss portions are clamped about the trunnions 44 carried by the axle supporting plate 45 which is welded or otherwise secured by the angle gussets 46 to the rear end 47 of the frame through the plate 48 which is bolted or otherwise secured thereto. The trunnions 44 are formed on the ends of a rectangular shaft which is welded or otherwise secured to the under side of the plate 45, and suitable trunnion engaging caps 49 and 50 are secured by these studs about the trunnions 44 to secure the axle assembly to the plate 45. It will be seen that with this arrangement the entire power plant assembly which is formed as a rigid unit from the power plant to the rear axle may rotate a limited amount about the trunnions 44 during assembly. This insures a positive mounting of the rear axle assembly in the frame.

Disposed above the rear axle assembly 9 is an operator's seat 52 which may be of any conventional form and which is supported by means of the angles 53 welded to the rear frame member 47 and the side angles 54 welded to the sides of the frame adjacent the rear end thereof. A seat back 55 is also provided, and it will be noted that the side wall of the frame is cut away in an arcuate form, as indicated at 56, with its lowermost point adjacent between the connection between the clutch and the transmission to afford easy access to the operator. The floorboards 58 of the tractor are supported at the rear end by the transversely extending Z-shaped member 59, which is secured at its ends to the angle bracket 60 of the frame, and are supported laterally by means of the angles 62 secured to the side wall of the frame. The intermediate portion of the power plant assembly is unsupported on the frame and disposed above the transversely extending T-shaped frame member 64 which extends beneath the flywheel housing, and at its opposite ends is secured to the brackets 65 carried by the side frames of the body 6. In its center the member 64 is formed with an arcuately depressed portion which clears the corresponding lower arcuate portion of the flywheel housing.

The forward end of the tractor is provided with a plate member 68 which is bolted or otherwise secured to the forward end of the engine block, and which is provided with a recessed portion in which the pulley 69 carried at the forward end of the engine crankshaft is received. This plate member is adapted to be secured to the forward cross plate 18, supported on the brackets 19 and extending transversely across the body adjacent the lower portion thereof, by means of suitable rubber motor supports 70 which are secured between the plate 18 and the plate 68. This provides for a resilient mounting of the forward portion of the motor on the body.

Considering now in detail the front wheel suspension, which is shown more clearly in Figures 4 to 7, inclusive, the plate 18 which extends transversely across the body is provided with a stationary spindle 80 which is welded as indicated at 82 to the plate and which has an enlarged collar portion 83 similarly welded to a recess in the bottom face of the plate, as indicated at 84. Rotatably mounted upon the spindle 80 is a tubular steering housing 85 which, at its upper end, is adapted to receive the segment type steering gear 86 centered on the upper shoulder 87 of the housing. The gear 86, as shown in Figure 5, extends only 180° about the housing 85, and disposed on the opposite portion of the upper end of the housing 85 is a stop member 88 having the radially projecting stop lug 89 which limits the rotation of the gear 86 between the fixed stops 90 depending from the under surface of the plate 18.

The gear 86 is adapted to be engaged by an idler gear 92 carried upon the spindle 93, which spindle is rotatably mounted within a suitable recess in the plate 18 by means of the double tapered bearing assembly 94 held in position by the bearing cap 95 bolted to the annular retainer collar 96 which is welded or otherwise secured to the upper face of the plate 18, as indicated at 97. This intermediate gear 92 is adapted to be driven from an angularly inclined gear 98 carried at the lower end of a steering shaft 99 which is suitably supported by means of the housing 100 upon the face of the plate 18, which housing has the angular portion 102 receiving the bearings 103 for rotatably supporting the shaft in the housing, the bearings being retained by the cap 104 bolted to the angularly inclined face thereof. The plate 18 is provided with a suitable aperture 105 for receiving the housing assembly, and rotation of the gear 98 is adapted to rotate the intermediate gear 92, and thence impart rotation to the gear 86 and consequently to the housing 85.

At its upper end the steering shaft 99 passes through the support 106 bolted to the cowl 107 extending in a vertical plane across the opening in the body, and at its upper end is provided with the steering wheel 108 whereby rotation can be imparted thereto.

Referring again to Figure 4, it will be noted that the housing 85 is provided with two opposed downwardly and outwardly extending bosses 110 which are of frusto-conical form, and are adapted to form a seat for the relatively heavy coiled springs 112 extending therefrom. The housing 85 is supported by the tapered bearings 113 and 114 on the spindle 80, the spindle at its lower end being provided with the nut 115 for retaining the lowermost bearing in position. Below the nut 115 the housing 85 is provided with downwardly extending spaced shoulder portions 116 and 117 which are spaced apart to form supports for the longitudinally extending shaft 119 carried therein. Mounted on the shaft 119 are the forked arm portions 120 and 122 of a wheel supporting spindle, these arm portions having suitable bearing sleeves 123 therein for rotatably journalling them on the shaft 119. It will be noted that the arm portions 120 and 122 are both disposed on the same relative sides of the fork portions 116 and 117. Disposed against the opposite faces of the fork portions 116 and 117 are the arm portions 124 and 125 of a corresponding steering spindle also mounted upon bearing sleeves 123. Thus it will be seen that the shaft 119 supported by the arms 116 and 117 of the steering housing forms the pivotal support for the steering spindle housings 126 and 127, respectively. Secured in each of these housings, as by welding or the like, are steering spindle shafts 128 and 129, respectively, each of these shafts extending radially with respect to the shaft 119 and normally in a position inclined slightly downwardly with respect thereto. Mounted on the respective shafts 128 and 129 are the hubs 130 of the forward wheels 10 of the tractor, these hubs being mounted by suitable bearings 132 for rotation about the shafts 128 and 129 and being retained against axial movement by means of the nuts 134 on the ends of each of the shafts.

It will be apparent that the steering spindle housings 126 and 127 are restrained against rotation except about the axis of the shaft 119, and therefore they act to allow the spindles 128 and 129 to move about the shaft 119 as a center in the same vertical plane whereby the wheels 10 can move vertically over obstructions or the like, such as indicated at 136 in Figure 4, in which the right hand wheel is shown in raised position with the left hand wheel in normal position.

Each of the housings 126 and 127 is provided with an upwardly and outwardly extending plate portion 137 and 138, respectively, which plate portions have secured thereto and projecting normally therefrom the rubber bumpers 139 and 140, respectively. Extending about these bumpers are the springs 112 which are seated on the bosses 110 of the steering housing 85. It will therefore be apparent that as the wheel 10 moves upwardly, the plate portion 138 will move toward the boss portion 110 of the steering housing, and will result in compression of the corresponding spring 112. This spring normally is of sufficient strength to hold the wheels in the caster arrangement, whereby they are inclined at a slight angle with respect to each other and with respect to the housing 85. However, if an obstruction is encountered, the springs can be compressed and the wheels can move upwardly to a position in which the rubber bumpers engage the bosses 110 and limit further movement. This provides a quiet cushioning knee action construction for the front steering wheel assembly, and insures a smooth comfortable movement of the tractor without imparting any jolts or jars to the operator.

It will also be apparent that from the location of the stops 90 that the steering assembly can be turned through a complete angle of 145° from one extreme position to the other, giving the steering angle in either direction from straight ahead position of 72½°, which is ample to insure maneuverability and yet is limited so that there is no possibility of the steering assembly moving transverse to the direction of travel to the drive wheels 12. This turning is effected in a simplified manner through the gears 98, 92 and 96, it being apparent that any suitable reduction can be provided through this set of gears to provide a proper steering action.

The wheels 10 are resiliently tired, as indicated at 142, as are also the wheels 12, as indicated at 143. If desired, pneumatic tires may be employed, or soft solid rubber tires can be used in situations which do not require the pneumatic tires. The depending arms 116 and 117 of the steering housing 85 are preferably provided with downward extensions 145 which limit the possible raising movement imparted by the springs 112 to the vehicle when the wheels are resting on the ground to prevent any possibility of a wheel being moved by these springs downwardly into a position in which it would become inoperative.

It will be apparent from this description that we have provided a very simple type of construction in which the tractor body forms the supporting chassis for the power plant and drive axle assembly, and no auxiliary chassis is necessary. The body is also shaped so as to allow close maneuvering, being limited in width to the tread of the wheels 12 and having a relatively stiff nose portion 17 which can be used for bumping purposes or pushing purposes, the tractor preferably being provided with the coupling mechanism 146 on the rear wall 47 so that trailers or the like may be coupled thereto for towing purposes. The rear wall 47 of the tractor body extends sufficiently high so as to protect the operator from possible injury, and extending over the forward portion of the body is a curved hood 147 which is preferably hinged at its rear end, as indicated at 148, so that it may be raised for inspection of the engine and for servicing the same with water and oil.

We are aware that various changes may be made in certain details of construction of the present invention without departing from the underlying principles thereof, and we therefore do not intend to be limited except as defined by the scope and spirit of the appended claims.

We claim:

1. In an industrial tractor having a body and a power drive assembly therein, a transverse plate in the forward end of said body forming a support for one end of said assembly, a post fixed to and depending from said plate, a steering housing rotatable about the post and carrying steering means at the lower end thereof, a gear secured to the upper end of said housing, means between said plate and housing limiting the arc of rotation of said gear, an intermediate gear journalled on said plate and meshing with said first gear, an angularly inclined steering post, a gear at the lower end thereof meshing with said intermediate gear, and a steering wheel at the upper end of said steering post for imparting rotation to said housing through said gears.

2. In an industrial tractor having a power drive assembly including a pair of driving wheels, steering means for said tractor forwardly of said driving wheels comprising a housing mounted for rotation about a vertical axis, a shaft extending normal to and carried in the lower end of said housing, oppositely extending wheel spindles pivotally mounted on said shaft for swinging movement in a vertical plane and conjointly rotatable with said housing, a steering wheel rotatably mounted on each spindle, spring means biased between said housing and each spindle normally holding said spindle in cambered steering relationship but providing for relative vertical movement thereof caused by roadway inequalities, and rubber cushioning means limiting upward movement of said spindles relative to said housing.

3. In a tractor having a transverse plate secured across one end thereof, a post secured to and depending from said plate, a steering sleeve rotatably journalled on said post, means for rotating said sleeve, a transverse pin carried in the lower end of said sleeve, laterally extending wheel spindles journalled for vertical movement on said pin on opposite sides of said sleeve, and angularly extending resilient means biased between said spindles and sleeve resisting upward vertical movement of said spindles, said resilient means normally holding said spindles in cambered relationship.

4. A tractor steering assembly including a rigid vertical post, a steering sleeve rotatably journalled on said post, means at the upper end of said sleeve for rotating the same, a bifurcated end on the opposite end of said sleeve carrying a transverse pin, laterally extending wheel spindles having end portions journalled at the lower end of said sleeve about said pin for vertical movement, and spring means biased between said spindles and sleeve normally resisting upward vertical movement of said spindles.

5. A tractor steering assembly including a rigid depending post, a housing journalled thereon and having a transverse journal at the lower end thereof, opposed laterally extending wheel spindles mounted on said journal, cushioned shock absorbing means between said spindles and said housing, spring means normally urging said spindles downwardly away from said housing, and means limiting said action of said spring means.

6. A tractor steering assembly including a vertically extending rotatable sleeve, means at the upper end of said sleeve for rotating the same, means on the lower end of said sleeve supporting a transverse journal pin, a pair of laterally extending wheel spindles having their adjacent ends commonly journalled on said pin, and wheels rotatably mounted on said spindles.

7. The assembly of claim 6 further characterized in the provision of means biased between said sleeve and spindles holding said spindles in a position to incline said wheels toward each other.

8. The assembly of claim 6 further characterized in the provision of a frame plate having a depending rigid post upon which said sleeve is journalled, and spring means biased between the sleeve and spindles transferring a portion of the load of said plate onto said spindles.

9. In combination, a pair of opposed laterally extending wheel spindles, a transverse journal pin forming a common pivot for adjacent ends of said spindles whereby they may have relative vertical movement, means supporting said pin including a rotatable housing, diverging bosses on said housing above said spindles, reaction surfaces on said spindles in line with said bosses, and spring means biased between said bosses and spindle surfaces resisting upward vertical movement of said spindles about said pin.

10. In combination, a rigid vertical post, means for imposing a vertical load thereon, a housing encircling said post, thrust bearing means rotatably journalling said housing on said post, said housing carrying a transverse pin at the lower end thereof rotatable therewith, a pair of wheel spindles journalled at adjacent ends on said pin and extending laterally to each side thereof, wheels rotatable on said spindles, and resilient means biased at an angle between said housing and said spindles counteracting the load imposed on said spindles through said pin to hold said spindles at an angle such as to provide the desired camber between said wheels for steering action upon rotation of said housing.

11. In a tractor, a transverse plate at one end thereof, a gear journalled for rotation on the under side of said plate, a depending rigid post on said plate laterally spaced from said gear, a housing rotatably mounted on said post having gear means in meshing engagement with said gear, and having a bifurcated lower end provided with a transverse pin, wheel spindles pivotally journalled on said pin at the lower end of said housing and carrying steering wheels thereon, spring means limiting upward movement of said spindles about their journal, steering means having driving engagement with said gear, said gear means comprising an arcuate segment gear, and means on said plate for limiting rotation of said housing.

ELMER J. DUNHAM.
WAYNE GUNNING.